UNITED STATES PATENT OFFICE.

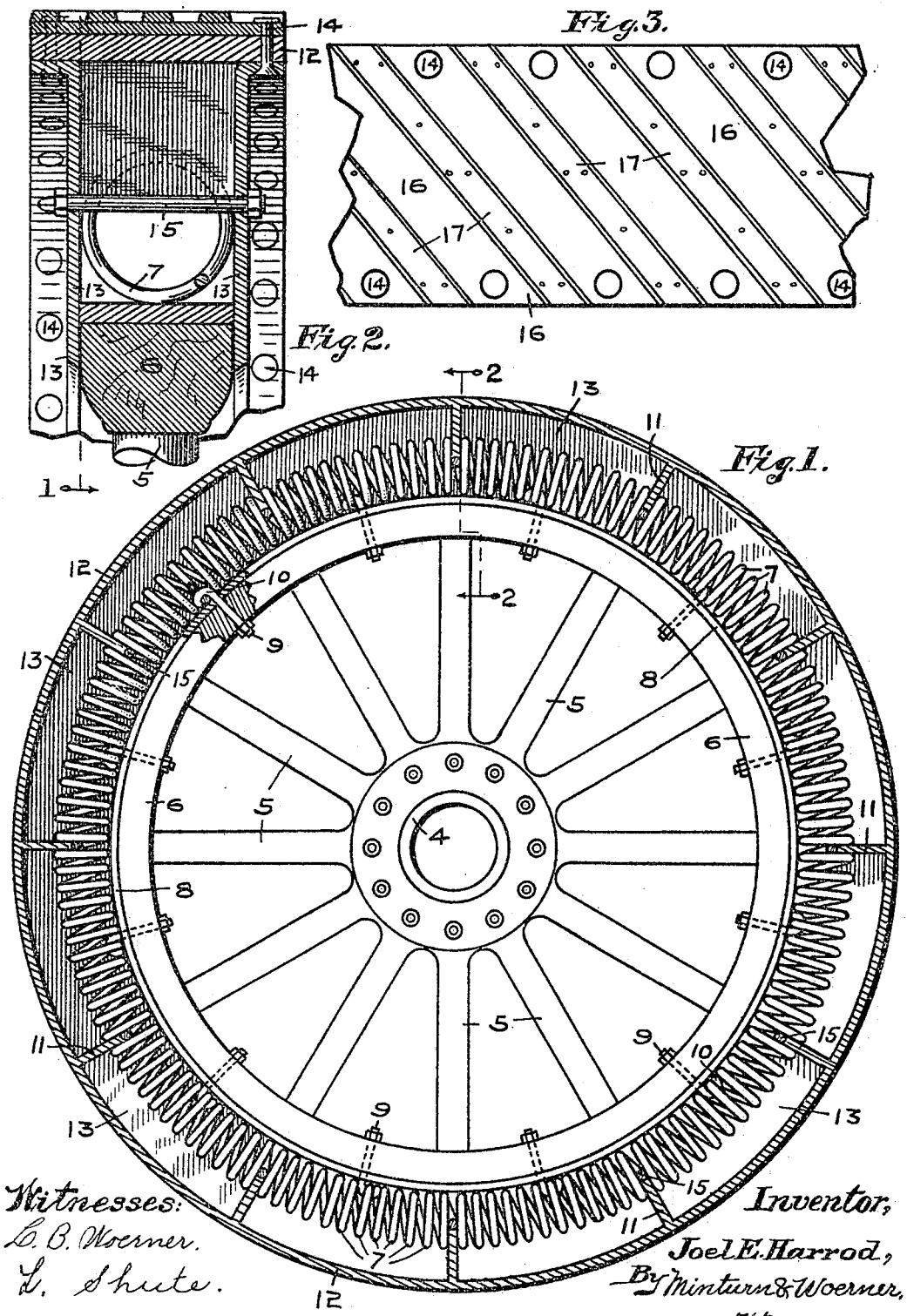

JOEL E. HARROD, OF INDIANAPOLIS, INDIANA.

VEHICLE-WHEEL.

No. 798,728.      Specification of Letters Patent.      Patented Sept. 5, 1905.

Application filed November 15, 1904. Serial No. 232,833.

*To all whom it may concern:*

Be it known that I, JOEL E. HARROD, a citizen of the United States, residing at Indianapolis, in the county of Marion and State of Indiana, have invented certain new and useful Improvements in Vehicle-Wheels, of which the following is a specification.

This invention relates to improvements in elastic tires for vehicles, and has special reference to improvements in tires for automobiles and to a practical substitute for pneumatic and other rubber tires for such vehicles.

The object of the invention is to provide a tire which will afford a maximum resiliency without the danger of collapse which attends the puncturing of the pneumatic tire heretofore in use.

I accomplish the objects of the invention by the mechanism illustrated in the accompanying drawings, in which—

Figure 1 is a view in side elevation and partial vertical section of a wheel provided with my improved tire, the view showing the tire without the covering which I ordinarily employ for the purpose of deadening the sound of the wheel. The sectional line on which Fig. 1 is taken is shown by the dotted line 1 of Fig. 2. Fig. 2 is a detail in cross-section on the line 2 2 of Fig. 1, and Fig. 3 is a detail representing a portion of the periphery or face of the wheel and is intended particularly to show the construction of the diagonal cleats for increasing the traction of the wheel.

Like characters of reference indicate like parts throughout the several views of the drawings.

4 is the hub of the wheel, 5 the spokes, and 6 is the felly, of any usual and suitable construction.

7 is a spring which is formed out of spring-metal wire spirally wound and extending continuously around the periphery of the wheel.

The felly 6 has the metal tire 8 between it and the spring 7, and passing through the felly between each pair of spokes is a bolt 9, having a hook 10 on its outer end adapted to overlap one of the spring-coils at the inner turn of said coil and hold the springs securely in position against the tire 8. It will be noted that these bolt-hooks 9 also prevent the longitudinal movement of the spring upon the wheel.

Entering between the coils of spring 7 at predetermined positions of the circumference of the wheel are the radial plates 11, which project inwardly from the annular plate or tire 12. This plate 12 has the inwardly-extended flange-plates 13 13, which are parallel with each other and with plate 12 form a housing wherein the spring 7 is inclosed. The flange-plates 13 may be formed integrally with the plate 12, or they may have outside marginal flanges, whereby by means of the rivets 14 said plates 13 are fastened to the plates 12. The two plates 13 are parallel with each other and overlap the felly 6 in the manner as shown in Fig. 2, whereby the felly completes the closure to the interior of the housing formed by said flange-plates and tire 12 to prevent the entrance of sand and gravel and other foreign substances into the chamber formed within said housing. It will be noted that the diameter of the spring-coil 7 is only a little more than half of the radial dimensions between the tires 8 and 12. The unoccupied space within said housing affords room for the adjustment of the housing to and from the felly of the wheel under the stress placed upon the wheel by the load on the vehicle. It will also be noted that the radial plates 11 extend in from the tire-plate 12 a distance approximately equal to the diameter of the coils of spring 7.

At the inner ends of plates 11 are the bolts 15, which connect the plates 13 and serve to prevent the spread of the latter. The distance from bolts 15 to the tire 8 is the same as the distance from tire 12 to spring 7, whereby when the tire-plate 12 is forced in by a heavy load on the vehicle the said plate 12 will come in contact with the spring and have a bearing thereon, and at the same time the adjacent bolts 15 will contact with the tire 8, thereby providing an additional secure bearing for the support of the weight of the vehicle without undue strain on the spring.

The peculiar feature of my invention whereby I secure the greatest efficiency lies in the manner in which the load is transmitted to the spring 7. The housing of which plate 12 is a part has a constant bearing upon the ground or other surface over which the wheel is traveling, and the weight of the vehicle applied to the wheel through hub 4 would depress the wheel until its tire 8 came in contact with plate 12 or the radial plates 11 and the bolts 15 but for the action of the spring 7. The spring 7 by being held against longitudinal movement by the bolt-hooks 9 will present the entire load of the vehicle against those radial plates 11 which happen to be at the moment on the sides of the wheel. As these plates 11 approach a horizontal position they will receive an increasing load, which is transmitted to them through the spring-coils above them. This load will cause a compression of the spring, which will be resisted by the tension of the spring, thereby securing the ease and comfort which it is sought to obtain. As the plates 11 depart from a horizontal position they sustain a correspondingly less amount of the weight until in their vertical positions they are free to slide between the coils of the spring without straining the latter at all.

While I have shown a continuous spring extending entirely around a felly of the wheel, it is obvious that a plurality of springs each extending from one plate 11 to the next and secured by bolt 9 to the felly might be used with satisfactory results, and I therefore do not desire to limit my invention to this continuous construction.

The tire-plate 12 will be of steel or other metal which by contact with the ground will make more or less noise, and in order to deaden the sound I will provide a covering 16, of leather or other soft and elastic material, and to increase the traction I secure the diagonal strips 17 to said covering 16.

While I have shown and described the radial plates 11 as part of my invention, they are not necessary features of my construction if the bolts 15 are used, for the reason that the bolts 15 will take the weight from the springs and transmit it to the housing without the need of said plates 11, and for this reason I do not desire to limit my invention to the use of said radial plates.

Having thus fully described my invention, what I claim as new, and wish to secure by Letters Patent, is—

1. A wheel having a felly, one or more spirally-wound springs fixed to the periphery of the wheel, a tire-plate surrounding the spring and radial extensions from said tire-plate entering between the coils of said spring.

2. A wheel, a coiled spring or springs surrounding the periphery of said wheel and bolted thereto, a tire surrounding the coiled spring, said tire having a pair of parallel inwardly-extended flanges between which said spring is located, and bolts connecting said flanges and passing through the spring.

3. A wheel having a felly, a spirally-wound spring or springs bolted to the periphery of the wheel, a tire-plate surrounding the spring, a pair of parallel inwardly-projected flanges from said tire-plate overlapping said felly and forming a housing, and means for securing said housing to said spring or springs said means comprising flanges extending in radially from the tire-plate, between coils of the spring.

4. A wheel having a felly, a tire surrounding said felly, a spirally-wound spring or springs extending continuously around said tire, bolt-hooks to secure the spring to said felly, a tire-plate surrounding said spring, parallel inwardly-extended flanges from said tire-plate radial transverse flanges extending in between coils of the spring from said tire-plate, and transverse bolts connecting said flanges and passing through said spring.

5. A vehicle-wheel having a felly bound with a metal tire, a spirally-wound spring or springs, bolt-hooks securing said spring or springs to said felly, a tire-plate surrounding said spring or springs, parallel flanges from said tire-plate forming a housing, flanges from the tire extending in radially between coils of the spring, means for movably securing the housing to the spring or springs, said tire-plate having a covering of leather or other material to deaden the sound.

In witness whereof I have hereunto set my hand and seal, at Indianapolis, Indiana, this 11th day of November, A. D. 1904.

JOEL E. HARROD. [L. S.]

Witnesses:
F. W. WOERNER,
J. A. MINTURN.